3,079,237
ELECTROLYTIC PRODUCTION OF $O_2$ FROM $CO_2$
Thomas Ivan Taylor, Leonia, N.J., assignor to Isomet Corporation, Palisades Park, N.J., a corporation of New Jersey
Filed Jan. 29, 1959, Ser. No. 789,999
16 Claims. (Cl. 23—209.5)

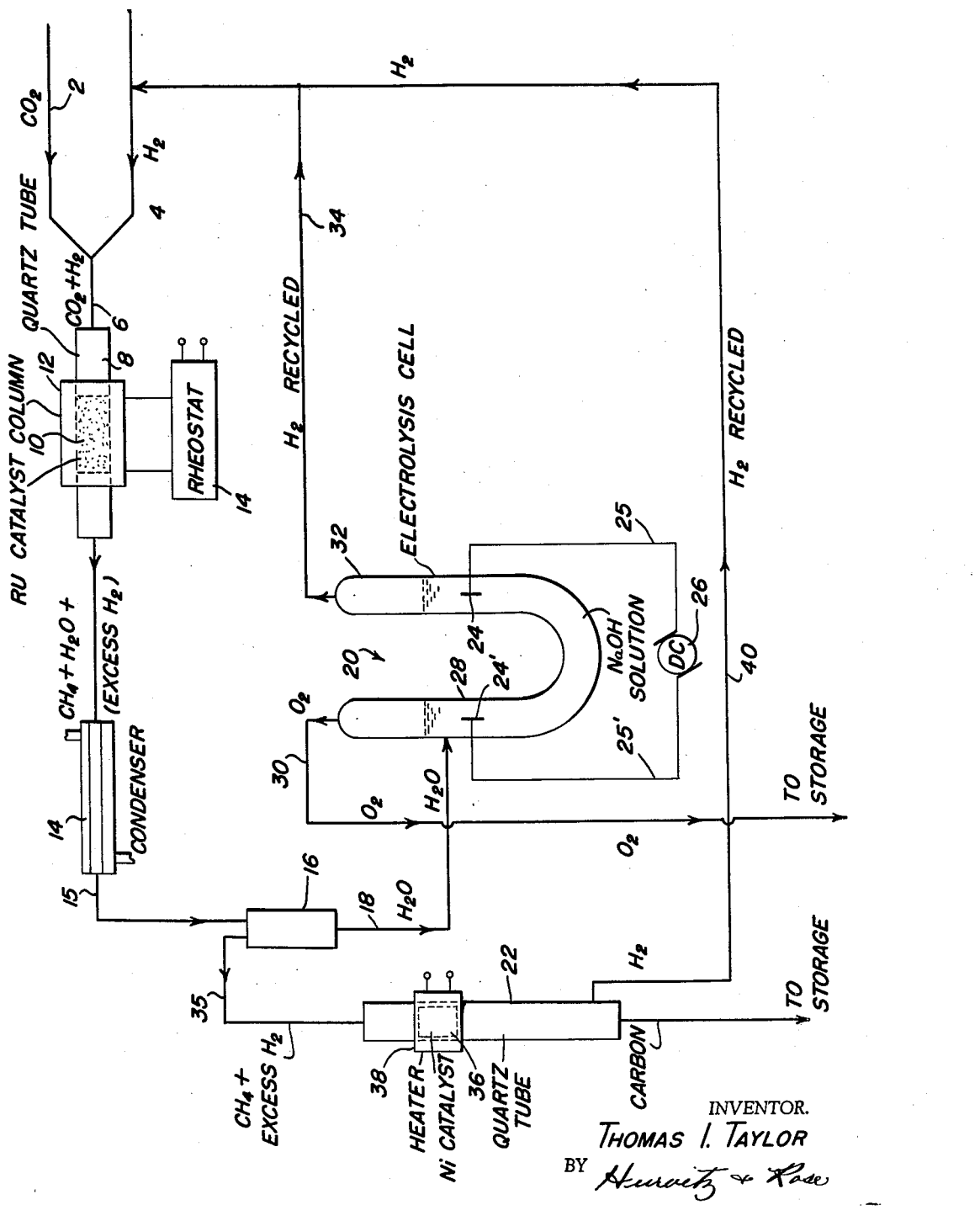

This invention relates to a cyclic process and apparatus for converting $CO_2$ to $O_2$ and has particular application to the elimination of $CO_2$ that is continuously being produced in a closed space, by converting the $CO_2$ to $O_2$ and C. More particularly, this process may be used in converting $CO_2$ that accumulates in the atmosphere of a submarine vessel or a manned space vehicle as a result of the respiration of its occupants.

As is well known, animal respiration involves taking $O_2$ from the atmosphere and giving up to the atmosphere $CO_2$ produced in the animal. Accordingly, if an animal is to survive in a closed space $O_2$ must be added to the atmosphere and the $CO_2$ must be removed. Ordinarily, in submarines, for example, this is effected by supplying $O_2$ from storage tanks. The storage of a large number of $O_2$ tanks for long periods of submergence presents very distinct disadvantages. Also the storage of relatively large quantities of absorbents for $CO_2$ presents a problem.

In accordance with the present invention the $O_2$ in the atmosphere can be replenished by using $CO_2$ given up during respiration as a source material for the $O_2$.

It is accordingly an object of the present invention to provide a cyclic process for converting $CO_2$ to $O_2$.

It is a further object of the present invention to provide an apparatus for effecting conversion of $CO_2$ to $O_2$.

It is a further object of the present invention to provide a process and apparatus adapted to convert to $O_2$, $CO_2$ collecting in a confined area.

Other and more detailed objects and features of the invention will be apparent from the following description and drawings, the latter being a schematic representation of an embodiment of the present invention.

In accordance with the present invention a $CO_2$ containing gas, for example, that accumulated in the atmosphere of a submerged submarine or space vehicle, is reacted catalytically with hydrogen to produce methane and water. The hydrogen may be supplied partly from a source outside the system and partly from hydrogen produced in the cyclic process of the invention. This reaction may be represented by the equation:

(1)
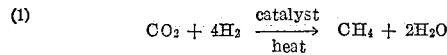

A number of catalysts may be employed in this reaction, among which may be mentioned Ni, Co, Fe, Ni on $Al_2O_3$ carrier and Ru or Pt. The Ru and Pt are also preferably used on an $Al_2O_3$ or MgO carrier.

As will be noted from Equation 1, the products of this reaction are methane and water, a gaseous mixture. In accordance with the present invention this gaseous mixture is passed through a condenser, which condenses the water vapor in the mixture and leaves methane. The condensed water is conveyed to an electrolysis cell, which will be described in more detail below, whereas the methane is conducted to a second catalytic reaction step.

The second catalytic reaction step is designed to convert the methane to carbon and hydrogen and may be represented by the following equation:

(2)
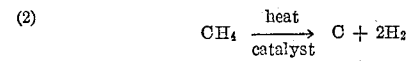

The carbon produced in this step may be removed from the system in a suitable fashion and pelleted or made into briquettes. The hydrogen produced is recycled to the first catalytic step, to be used in the conversion of $CO_2$ to methane and $H_2O$.

A large number of catalysts may be employed in the reaction described by Equation 2. Among these catalysts may be mentioned those containing Ni, Co, Fe, Pt, etc.

As an alternative the methane gas may be subjected to the action of an arc or electrical discharge, or to the action of ultra-violet rays or nuclear radiations. In this case, the products produced are carbon, ethylene and hydrogen.

Referring again to Equation 1, water is a product of the reaction of $CO_2$ and hydrogen. This water is conveyed to an electrolysis cell, which generates $O_2$. To this end, the water is mixed with acid or alkali (e.g. $NaOH_4$) in the electrolysis cell and is then subjected to the electrolytic action of a direct electric current. The important products of this electrolysis are hydrogen and oxygen. The oxygen may be returned to the atmosphere or a storage tank. The hydrogen produced is recycled to the first catalytic reaction step, also to be used in converting $CO_2$ to methane and water.

After the system has reached equilibrium, it requires no externally supplied material, other than $CO_2$. The system therefore once started and permitted to attain a steady state utilizes $CO_2$ as a sole source material for producing $O_2$ with carbon as a by-product.

The present process for reaction of $CO_2$ with hydrogen may be operated over a wide temperature range, depending on the catalyst. Thus, for example, it may be operated at temperatures in the range of from about 100° C. to about 400° C. and preferably in the range of about 120° C. to about 370° C. However, higher temperatures may be used, i.e., temperatures of up to about 800° C.

The rate of flow of the reactants which initiate the cycle, i.e., $CO_2$ and $H_2$, may also be varied over a wide range. In a laboratory arrangement it was found that a suitable flow of $CO_2$ would be in the range of 50 to 225 cc./min. and preferably 65 to 210 cc./min. and the $H_2$ preferably in the range of 400 to 900 cc./min. It is to be understood, however, that these gases are to be fed at such a rate that the gas mixture inside the first catalytic reaction chamber satisfies at least the theoretical requiremen for reaction of $CO_2$ and hydrogen set forth in Equation 1.

The following non-restrictive example is further illustrative of the present invention.

*Example*

For the purposes of this example, the arrangement illustrated schematically in the drawing was employed. Referring more particularly to the drawing, $H_2$ derived from an outside source, and also obtained from the action of the system itself is fed via feed line 4 to line 6, where it is mixed with the $CO_2$ from an outside source by feed line 2. The gas mixture is introduced into quartz reaction tube 8, provided with an Ru catalyst column 10. The velocity of the $CO_2$ gas stream is maintained at a flow rate of between 65 cc./min. and 210 cc./min. and the $H_2$ flow is maintained at a rate of between 400 and 900 cc./min. Surrounding tube 8, in the vicinity of catalyst column 10, is an electrical furnace 12 which is connected via a rheostat 14 to supply terminals. Rheostat 14 serves to control the current fed to electrical furnace 12 and thus the temperature of the furnace 12.

The column of Ru catalyst 10 was prepared as follows: 15 grams of ruthenium chloride was dissolved in 20 ml. of water and poured over 15 grams of $Al_2O_3$ catalyst support pellets. This was evaporated slowly under infrared lamps. After it was dry it was placed in a tube and treated with $H_2$ (at 100° C. and then 200° C.). Other catalysts containing Ni, Pt, etc., may also be employed.

The temperature of the furnace 12 was maintained in the range of about 120° C. to 368° C.

The product gases leaving tube 8 are conveyed to condenser 14, wherein the $H_2O$ is preliminarily condensed and separated from the methane and excess hydrogen. The mixture leaving condenser 14 is fed by line 15 to an $H_2O$ storage vat 16 wherein the methane and $H_2$ are further separated from the water.

The water collected in storage tank 16 is conveyed by line 18 to electrolysis cell 20 whereas the methane and excess $H_2$ is conveyed to a second quartz catalytic reaction tube 22.

Electrolysis cell 20 is provided with a pair of electrodes 24 and 24' which are connected by means of electrical lead lines 25 and 25' to a D.C. generator 26. Batteries may be used in place of the D.C. generator.

The water entering electrolysis tube 20 mixes with the NaOH solution maintained therein and the solution is thus kept basic. The resulting solution, under the influence of the electrical current supplied to it by generator 26, produces $O_2$ which collects at electrode 24' and rises through the arm 28 of electrolysis tube 20 and is conveyed by line 30 to an $O_2$ storage tank, not shown. Hydrogen collects at electrodes 24 during the electrolysis and rises through arm 32 of the electrolysis tube 20 and is recycled by line 34 to the $H_2$ feed line 4.

The methane and excess $H_2$ separated in storage tank 16 are conveyed to quartz reaction tube 22 by means of line 35. Reaction tube 22 is provided with a Ni catalyst element 36 which consists of nickel metal particles distributed on a stainless steel wire screen. Surrounding this element, and extending about the outside surface of quartz tube 22, is a heater 38. This serves to maintain the temperature of reaction tube 22 in the range of about 650 to 800° C.

The $H_2$ produced in reaction tube 22 is recycled by means of line 40 to the hydrogen feed line 4. The carbon resulting from the reaction may be removed in any convenient manner. Reaction tube 22 may be replaced from time to time with a tube containing fresh catalyst.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A cyclic process for the production of $O_2$ from $CO_2$ which comprises catalytically reacting a mixture of $CO_2$ and hydrogen in a first catalytic reaction zone to produce product vapors containing methane and water vapor, separating the methane and water, conveying said water to an electrolysis zone and said methane to a second catalytic reaction zone; electrolysing the water in said electrolysis zone whereby $H_2$ and $O_2$ are formed, recycling the $H_2$ to said first reaction zone and recovering $O_2$ from said electrolysis zone; catalytically reacting said methane in said second reaction zone whereby $H_2$ and carbon are produced, recycling the $H_2$ obtained from said second catalytic reaction to said first catalytic reaction zone and recovering said carbon from said second catalytic reaction zone.

2. A process according to claim 1 wherein a catalyst selected from the class consisting of metallic Ni, Co, Fe and Pt and Ru is maintained in said first catalytic reaction zone and a catalyst selected from the class consisting of metallic Ni, Co, Fe and Pt is maintained in said second catalytic reaction zone.

3. A process according to claim 2 wherein the catalyst in said first reaction zone is metallic ruthenium on aluminum oxide carrier and the catalyst in said second reaction zone is metallic nickel disposed on a stainless steel wire screen.

4. A process according to claim 2 wherein the temperature of the reaction of $CO_2$ with $H_2$ is maintained in the range of 100° to about 400° C. and the conversion of $CH_4$ to C is effected between 600° C. and 850° C.

5. A cycle system useful for converting $CO_2$ gas to $O_2$ and carbon comprising in combination a first catalytic reaction chamber and a fluid condenser means, means for supplying $CO_2$ to said first catalytic chamber, conduit means connecting said first catalytic reaction chamber and said fluid condenser, fluid separating means down stream of said condenser for separating gases from liquids formed in said fluid condenser and conduit means connecting said fluid condenser and said fluid separating means, a second catalytic reaction chamber and an electrolysis cell, conduit means connecting said fluid separating means to said second catalytic reaction chamber and conduit means connecting said fluid separating means to said electrolysis cell, said second catalytic reaction chamber being provided with conduit means for discharging carbon and conduit means for recycling $H_2$ to said first catalytic reaction chamber, said electrolysis cell being provided with conduit means for removing $O_2$ formed therein and conduit means for recycling $H_2$ to said first catalytic reaction chamber.

6. A cyclic process for the production of $O_2$ from $CO_2$ which comprises catalytically reacting a mixture of $CO_2$ and hydrogen in a first catalytic reaction zone to produce product vapors containing methane and water vapor, separating the methane and water, conveying said water to an electrolysis zone and said methane to a second reaction zone; electrolysing the water in said electrolysis zone whereby $H_2$ and $O_2$ are formed, recycling the $H_2$ to said first reaction zone and recovering $O_2$ from said electrolysis zone; decomposing said methane in said second reaction zone whereby $H_2$ and carbon are produced, recycling the $H_2$ obtained from said second reaction to said first catalytic reaction zone and recovering said carbon from said second reaction zone.

7. The process of claim 6 wherein said methane is decomposed by an electric discharge in said second reactive zone.

8. The process of claim 6 wherein said methane is decomposed by heat in said second reaction zone.

9. A process according to claim 6 wherein a catalyst selected from the class consisting of metallic Ni, Co, Fe and Pt and Ru is maintained in said first catalytic reaction zone.

10. A process according to claim 6 wherein the catalyst in said first reaction zone is metallic ruthenium on aluminum oxide carrier.

11. A process according to claim 6 wherein the temperature of the reaction of $CO_2$ with $H_2$ is maintained in the range of 100° to about 400° C. and the conversion of $CH_4$ to C is effected between 600° and 850° C.

12. A cyclic system useful for converting $CO_2$ gas to $O_2$ and carbon comprising in combination a first catalytic reaction chamber and a fluid condenser means, conduit means for supplying $CO_2$ to said first chamber, conduit means connecting said first catalytic reaction chamber and said fluid condenser, fluid separating means down stream of said condenser for separating gases from liquids formed in said fluid condenser and conduit means connecting said fluid condenser and said fluid separating means, a second reaction chamber and an electrolysis cell, conduit means connecting said fluid separating means to said second reaction chamber and conduit means connecting said fluid separating means to said electrolysis cell, said second reaction chamber being provided with conduit means for discharging carbon and conduit means for recycling $H_2$ to said first catalystic reaction chamber, said electrolysis cell being provided with conduit means for removing $O_2$ formed therein and conduit means for recycling $H_2$ to said first catalytic reaction chamber.

13. The apparatus of claim 12 wherein said second reaction chamber includes a heater.

14. A cyclic process for the production of $O_2$ from $CO_2$ which comprises catalytically reacting a mixture of $CO_2$ and hydrogen in a first catalytic reaction zone to produce product vapors containing methane and water vapor, separating the methane and water, conveying said water to an electrolysis zone and said methane to a second reaction zone, electrolysing the water in said electrolysis zone whereby $H_2$ and $O_2$ are formed, recycling the $H_2$ to said first reaction zone and recovering $O_2$ from said electrolysis zone; decomposing said methane in said second reaction zone whereby $H_2$ and carbon are produced, and recycling the $H_2$ obtained from said second reaction to said first catalytic reaction zone.

15. A cyclic process for the production of $O_2$ from $CO_2$ which comprises catalytically reacting a mixture of $CO_2$ and hydrogen in a first catalytic reaction zone to produce product vapors containing methane and water vapor, separating the methane and water, conveying said water to a decomposing zone and said methane to a second reaction zone; decomposing the water in said decomposing zone whereby $H_2$ and $O_2$ are formed, recycling the $H_2$ to said first reaction zone and recovering $O_2$ from said decomposing zone; decomposing said methane in said second reaction zone whereby $H_2$ and carbon are produced, and recycling the $H_2$ obtained from said second reaction to said first catalytic reaction zone.

16. A cyclic process for the production of $O_2$ from $CO_2$ which comprises catalytically reacting a mixture of $CO_2$ and hydrogen in a first catalytic reaction zone to produce product vapors containing methane and water vapor, separating the methane and water, conveying said water to a decomposing zone and said methane to a second reaction zone; decomposing the water in said decomposing zone whereby $H_2$ and $O_2$ are formed, and recovering $O_2$ from said decomposing zone; decomposing said methane in said second reaction zone whereby $H_2$ and carbon are produced, and recycling the $H_2$ obtained from said second reaction to said first catalytic reaction zone.

References Cited in the file of this patent

UNITED STATES PATENTS

| | | |
|---|---|---|
| 1,643,663 | Klatte et al. | Sept. 27, 1927 |
| 1,735,925 | Jaeger | Nov. 19, 1929 |
| 1,999,573 | Odell | Apr. 30, 1935 |
| 2,070,612 | Niederreither | Feb. 16, 1937 |
| 2,384,463 | Gunn et al. | Sept. 11, 1945 |
| 2,760,847 | Oblad et al. | Aug. 28, 1956 |